Aug. 22, 1950         J. VAN TASSEL           2,519,517
                      EXPANSIBLE TRAILER
Filed Nov. 27, 1948                        3 Sheets-Sheet 1
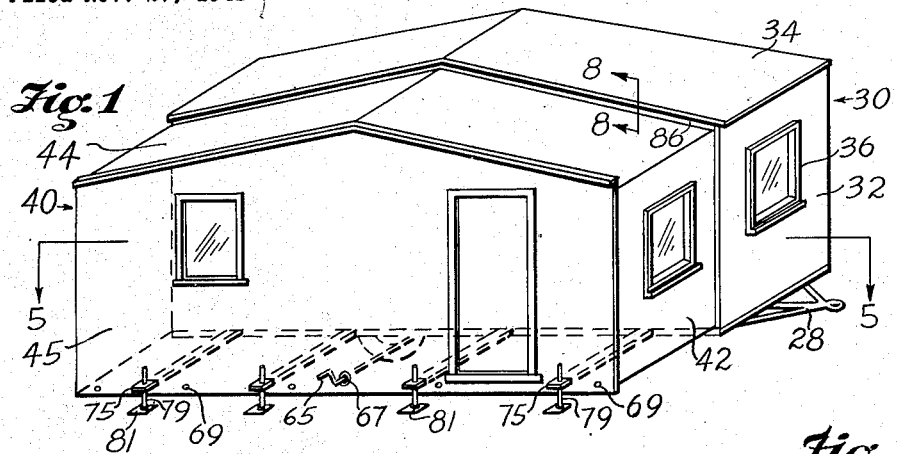
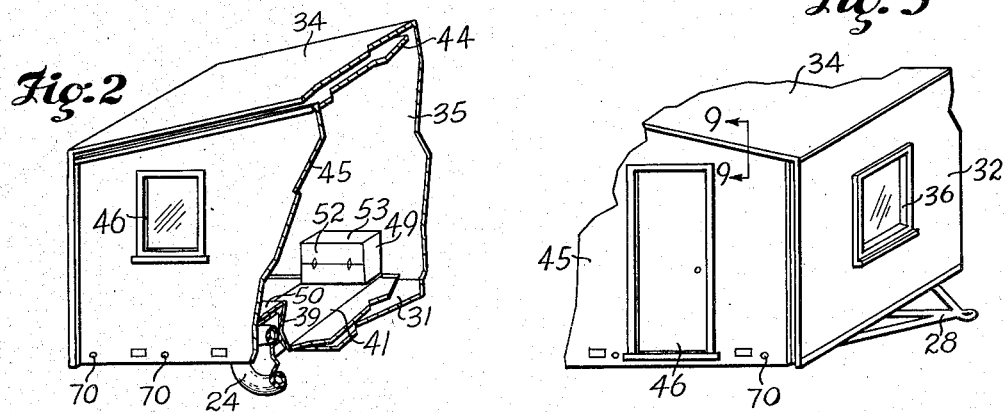
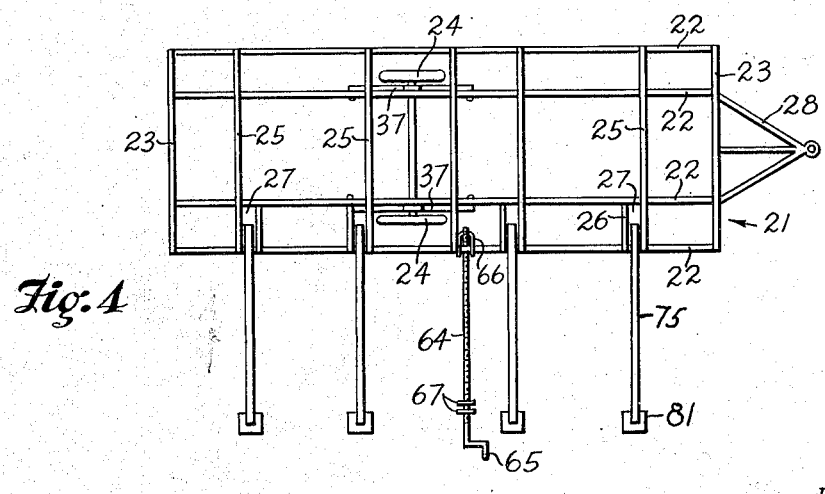
INVENTOR.
James Van Tassel
BY Stedman B. Hoar
         Agent Aug. 22, 1950 J. VAN TASSEL 2,519,517
EXPANSIBLE TRAILER
Filed Nov. 27, 1948 3 Sheets-Sheet 2

INVENTOR.
James Van Tassel
BY Stedman B Hoar
Agent

Aug. 22, 1950   J. VAN TASSEL   2,519,517
EXPANSIBLE TRAILER
Filed Nov. 27, 1948   3 Sheets-Sheet 3
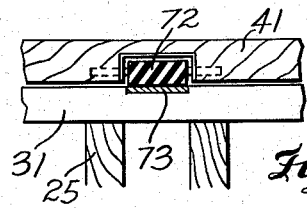
Fig. 10
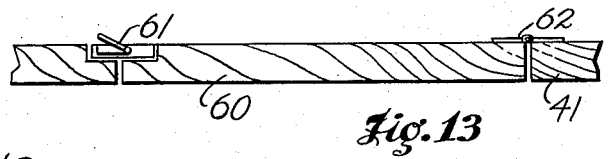
Fig. 13
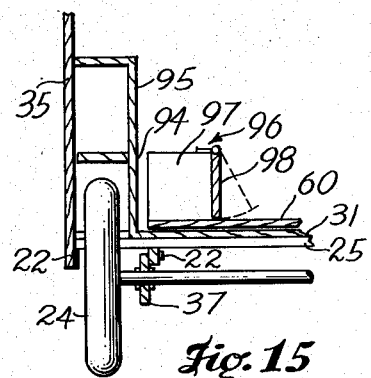
Fig. 15
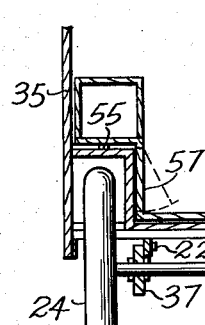
Fig. 12
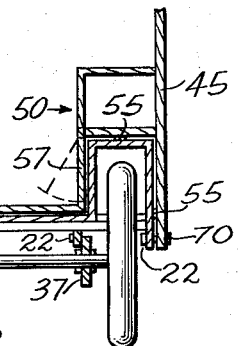
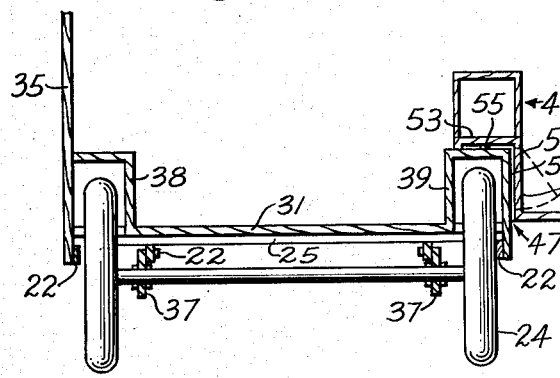
Fig. 11
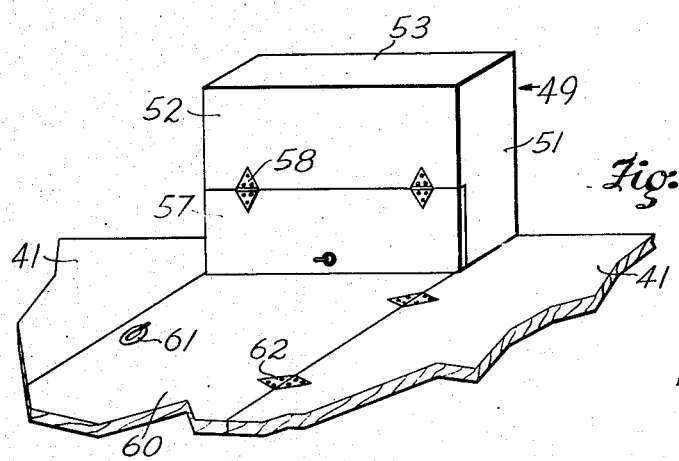
Fig. 14
INVENTOR.
James Van Tassel
BY Stedman B. Hoar
Agent Patented Aug. 22, 1950

2,519,517

UNITED STATES PATENT OFFICE 2,519,517

EXPANSIBLE TRAILER

James Van Tassel, Santa Ana, Calif., assignor to Alert Development Corporation, Santa Ana, Calif., a corporation of California Application November 27, 1948, Serial No. 62,385

7 Claims. (Cl. 296—23)

This invention relates to expansible vehicles, and more particularly relates to vehicles of the house or camp trailer type in the construction of which it is necessary to comply with regulatory requirements governing size and safety factors on the highways and also with local park and camp ordinances, and yet desirable to obtain all potential living space and comfort.

Other factors not found in ordinances and regulations apply to obtaining safety and also to obtaining comfort, and too often in the design of trailers too little consideration is given to these factors, among which may be mentioned the proper disposition of the center of gravity of the vehicle to eliminate sway. It is noticeable that in the great majority of designs for expansible trailers, the floor of the vehicle is placed at a level above the highest point attainable by the wheels, with allowance for relative movement of body and wheels by spring action. Such a floor height naturally tends to produce instability on the road, and is inconvenient in camp. In the relatively few designs in which the floor is lowered to correspond with modern automotive design, the wheel housings necessary to permit lateral expansion of a trailer occupy an inordinately large portion of the available floor space and greatly reduce the potential convenience of the trailer.

Then again the means used to move and to guide the expansible portions of a trailer in and out of their expanded position, and to support them in that position, have tended to be unwieldy and cumbersome. Clearly an expansible trailer can, under traffic regulations, be expanded only when off the highways. The mechanism necessary for altering the trailer from compacted to expanded form, and for returning it to compacted form, may and should be designed for use only when the trailer is at a camp site, and should not be required to sustain the wear incident to attempting to hold separate sections of the trailer rigidly during road use.

Another feature of past design of expansible trailers has been a tendency to complicate construction and to waste available space in order to achieve a totally unnecessary symmetry and balance in the expanded condition. A trailer which is to be expanded only at a camp site and then with adequate support, does not have to be expanded symmetrically. Simplified unilateral expansion not only can eliminate duplication of moving parts but can afford numerous opportunities for advantageous construction and arrangement which will be hereinafter pointed out.

It is, accordingly, an object of this invention to provide an expansible trailer of simple, inexpensive, and utilitarian construction.

It is a further object of this invention to provide a trailer having a low center of gravity when in transit, without sacrifice of interior accommodations in order to achieve a low floor level.

Another object of the invention is to provide an expansible trailer which may be quickly and easily converted to either its expanded or compacted form and having relatively few moving parts subject to road shocks.

Yet another object of the invention is to provide an expansible trailer having a large wall area and floor area available for built-in and permanently stationed furniture and fixtures in both its expanded and compacted forms.

With these objects in view, and others which will become apparent as the description of an embodiment of the invention proceeds, the invention may be suitably embodied as illustrated by way of example in the accompanying drawings, in which:

Fig. 1 is a perspective view of an extensible trailer constructed on the principles of the invention, the trailer being shown in its extended form;

Fig. 2 is a fragmentary perspective view of the rearward end of the trailer, showing the trailer compacted;

Fig. 3 is a fragmentary perspective view of the forward end of the trailer, showing the trailer compacted;

Fig. 4 is a plan view of the trailer chassis, showing also the supporting mechanism for the extensible section of the trailer as it would be installed preparatory to extending the extensible section and the moving mechanism in its relation to the chassis.

Fig. 10 is a vertical sectional view of the floor of the expansible section of the trailer, taken on the line 10—10 of Fig. 5;

Fig. 11 is a vertical transverse sectional view taken on the line 11—11 of Fig. 5, showing the arrangement of wheel housings when the trailer is extended;

Fig. 12 is a vertical transverse sectional view on the same plane of section as Fig. 11, but showing the trailer compacted;

Fig. 13 is a vertical longitudinal sectional view on the line 13—13 of Fig. 11, showing a hinged strip of flooring of the extensible section of the trailer;

Fig. 14 is a perspective view of a fragment of the extensible section of the trailer, showing the hinged floor strip in its relation to a wheel housing; and Fig. 15 is a fragmentary vertical transverse sectional view similar to Figs. 11 and 12, showing a modified form of wheel housing, the extensible section of the trailer being illustrated as in a position between extended and compacted positions.

Figure 6:
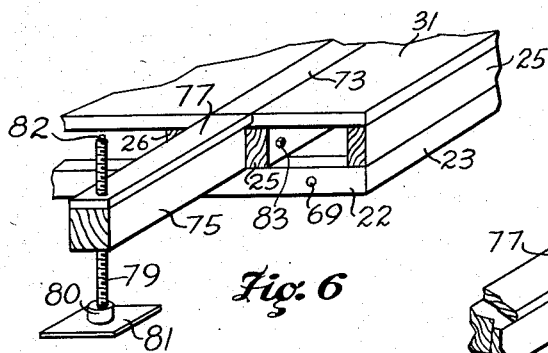
Fig. 6 is a fragmentary perspective view of one of the supports for the extensible section of the trailer, shown in Fig. 4, showing also the floor construction of the main section of the trailer.
Figure 7:
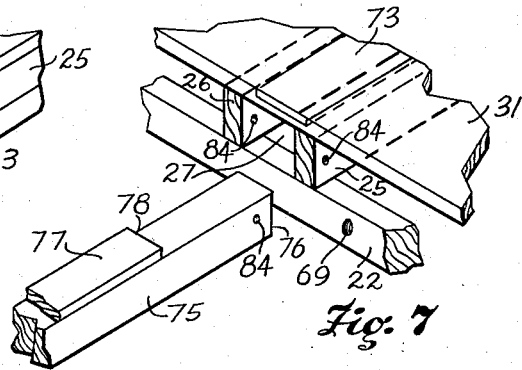
Fig. 7 is another fragmentary perspective view similar to Fig. 6, showing the support for the extensible section of the trailer separated from the chassis of the main section.

Referring now to the details of the drawings, my improved expansible trailer has, as an underbody, a chassis 21 which as best shown in Figs. 4, 6, and 7, comprises longitudinal frame members 22 and end frame members 23 which are supported on wheels 24 and in turn support transverse floor joists 25. Paired with sundry of the floor joists 25 are shorter floor joists 26, also supported by the frame members 22, and so arranged and spaced that the joists of each pair define narrow channels 27, the purpose of which will be hereinafter explained. A suitable draw-bar 28 is secured to the forward end of the chassis 21.

A main house section 30 is mounted upon the chassis 21, and is hereinafter referred to as the stationary section, inasmuch as it is secured to the chassis so as to be stationary with respect to the chassis. The house section 30 has a floor 31, forward and rearward end walls 32 and 33, a roof 34, and one side wall 35, the other side of the section being left open. Suitable windows or doors 36 may be provided in the end walls 32 and 33 and the side wall 35, as may be required, end windows being preferable to provide a rearward view through the trailer from a towing automobile and a view from the trailer towards the automobile.

The frame members 22 and 23 and the joists 25 are disposed at such a height relatively to the wheels 24, that the floor 31, which is secured to the joists 25, is disposed below the upper range of movement of the wheels 24, due allowance being made for the action of vehicular springs 37. As it is desirable not only to obtain the lowest center of gravity compatible with adequate road clearance but also to obtain the greatest width of floor allowable by highway regulations, the floor 31 extends outwardly laterally beyond the wheels 24 and is provided with wheel housings 38 and 39 which enclose the upper portions of the wheels in the conventional manner but are preferably of rectangular shape, rather than of the usual curvilinear form.

Fitting telescopically within the stationary section 30 is a movable house section 40 which is arranged to be moved laterally to an expanded position when the trailer is set up in camp as a house, or to be telescoped in a compacted position within the stationary section when the trailer is in use on the highways as a vehicle. Like the stationary section, the movable section 40 comprises a floor 41, a front wall 42 and rear wall 43, a roof 44, and a side wall 45, with the difference that the side wall 45 is on the opposite side of the trailer from the side wall 35 of the stationary section, corresponding to and closing the open side of the stationary structure when the two sections are compacted. Doors and windows 46 may be suitably placed in the walls 42, 43, and 45, with preference given to placement of end windows in the walls 42 and 43 so that they will be aligned with the end windows in the walls 32 and 33 when the sections are compacted.

To accommodate the wheel housings 38 and 39, openings 47 and 48 are provided in the lateral margins of the floor 41, as shown in Fig. 11, so that the wheel housings may extend upwardly above the floor 41 into the interior of the movable section 40. However, the openings 47 and 48 are enclosed by cover structures 49 and 50, so that the wheel housings are concealed from above in the compacted position of the trailer and in part concealed in the expanded position of the trailer. The cover structures 49 and 50 are each, preferably, rectangular structures having end walls 51, a side wall 52 and an upper closure 53. The structure 49 which is adjacent the open side of the movable section 40 is open at its side aligned above the margin of the floor 41—corresponding to the open side of the section 40. The cover structure 50, adjacent to the side wall 45 of the movable section 40 is closed at its outer side by the side wall 45.

The upper closures 53 of the cover structures 49 and 50 are preferably furniture fixtures, such as tables, chests, clothes lockers, or refrigerator boxes, being illustrated in the accompanying drawings as simple boxes indicative of functional character in addition to their function of enclosing the wheel housings 38 and 39. The preferred rectangular construction of the cover structures 49 and 50 enhances their adaptability as bases for furniture fixtures and the corresponding preferred rectangular construction of the wheel housings is not only more economical than curvilinear construction, but simplifies the use of gaskets or weatherstripping as indicated at 55 in Figs. 11 and 12, to effect a seal between the cover structures and the wheel housings.

To permit the movable section 40 to be moved laterally relatively to the stationary section 30, the side walls 52 of the cover structures 49 and 50 are provided with gates 57, which may be hung on hinges 58 so that they may be raised to permit the wheel housing 39 adjacent the open side of the section 30 to enter the cover structure and to emerge therefrom. It will be seen by comparison of Figs. 11 and 12, that the wheel housing 38, adjacent the closed side of the section 30, will be uncovered in the expanded position of the trailer and will enter the cover structure 49 through the open side thereof in the compacted position of the trailer. To further permit the wheel housing 39 to move from one to the other of the cover structures 49 and 50 (it will be understood that actually the cover structures are moved as part of the section 40) that portion 60 of the floor 41 disposed between the cover structures 49 and 50 is arranged to be movable relative to the remainder of the floor 41, the gates 57 and the floor portion 60 thus opening a path for the wheel housing 39 between the two cover structures and cooperating when closed to seal the floor openings 47 and 48 from the interior of the stationary section 30 and to conceal the wheel housings from said interior. The floor portion 60 may suitably be movable by a lifting ring 61 and hinges 62, as shown in Figs. 13 and 14.

Suitable mechanism may be provided to cause the movable section 40 to move telescopically with respect to the stationary section 30, such as a screw shaft 64, operated by a detachable crank handle 65. The shaft 64 (see Fig. 4) may be threaded in a block or nut 66 secured to a frame member 22 of the chassis 21, and may be provided with collars 67 which engage opposite sides of a ring bearing 68 in the side 45 of the movable section 40. The shaft 64 will thus move longitudinally with lateral movement of the section 40, causing such lateral movement by rotation in the nut 66. It is not, however, desirable to have the shaft 64 serve as a lock to hold the movable section 40 in compacted position during travel on the highways, both because of relative insecurity and because of resultant wear on the threads of the shaft and of the nut 66. Therefore I prefer to provide bolt holes 69 in the side wall 45, through which bolts 70 may be inserted into suitable threaded holes in the chassis 21, when the trailer is compacted as shown in Figs. 2 and 3.

To facilitate moving the movable section 40, suitable anti-friction devices may be provided to cause the floor 41 to slide or roll on the floor 31. Preferably, rollers 72, as shown in Fig. 10, are mounted in the floor 41 so as to protrude therebelow, and strips 73, which may be of hard plastic material or of metal are embedded in the upper surface of the floor 31 so as to be flush therewith and form part thereof. The rollers 72 and strips 73 are disposed above the channels 27 in the chassis 21, and preferably forwardly and aft of the hinged floor portion 60 so that there is no tendency to push that portion upwardly.

Extension rails 75 are provided for supporting the movable section 40 in its expanded position. The rails 75 are detachable and may be carried within the trailer when the trailer is on the highway, as they then have no function and would only be subject to wear and strain if made permanent parts of the trailer. Each of the rails 75 has one end 76 shaped to fit snugly within the channels 27 formed by the paired floor joists 25 and 26 and to be supported by the outer frame member 22 and has a raised bearing plate 77 extending on its upper side from a point adjacent its end 76 towards its other end and presenting a shoulder 78 which may abut against the floor 31. The bearing plates 77 thus become extensions of the strips 73, upon which the rollers 72 may roll. To support the outer ends of the rails 75, bolts 79 are threaded in the rails and in the bearing plates 77. The lower ends of the bolts 79 are freely rotatable in thrust collars 80 on support plates 81 and the upper ends 82 of the bolts are suitably shaped to receive a crank or wrench. The bolts 79 and support plates will ordinarily be separated from the rails 75 and stowed conveniently in the trailer when the trailer is on the highway, to be set up when the trailer arrives at a camping ground. The thrust collars 80 permit the support plates 81 to be placed on sloping ground.

The ends 76 of the rails 75 may be temporarily secured in the channels 27 by pins 83 passing through holes 84 in the joists 25 and 26 and in the rails 75.

Figure 9:
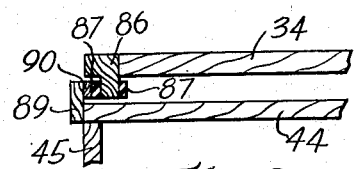
Fig. 9 is a vertical sectional view of the trailer
Figure 8:
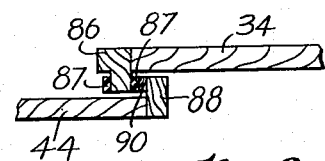
Fig. 8 is a vertical sectional view of the trailer roof in extended position, taken on the line 8—8 of Fig. 1.

The junctures of the roofs 34 and 44 and of the end walls 32 and 33 with the end walls 42 and 43 may be weatherproofed by suitable moldings and weatherstripping. In Figs. 8 and 9 I have shown simple and effective means for weatherproofing the roof junctures in the expanded and compacted position of the trailer. A cornice drip 86 is secured to the edge of the stationary roof 34 above the open side of the stationary section 30 and is provided with weatherstripping 87, suitably of rubber, on its inner and outer sides. Weatherboards 88 and 89 are secured to the margins of the roof 44 respectively above the open and closed sides of the movable section 40 and are provided with weatherstripping 90 on their opposed sides. In either position of the trailer, a seal is formed between one of the weatherstrips 87 and one of the weatherstrips 90. Similar sealing means may be used to seal the end walls of the trailer.

In Fig. 15 I have shown modified forms of a wheel housing and a cover structure for the closed side of the stationary section 30, and the open side of the movable section 40. A wheel housing 94 may be provided which is surmounted by a suitable furniture fixture 95. As the fixture 95 would interfere with an upper closure 53, the cover structure 96 is formed without such an upper closure, having only end walls 97 and a gate 98 fastened thereto.

Figure 5:
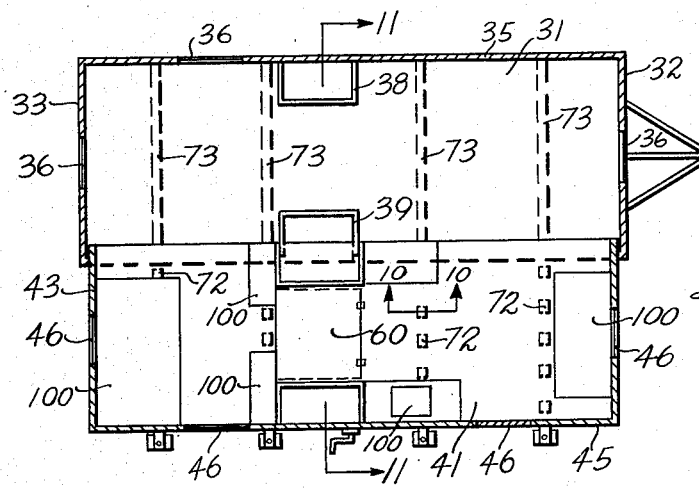
Fig. 5 is a horizontal sectional view taken on the line 5—5 of Fig. 1 with the direction of view as indicated showing a typical floor plan of the trailer in extended position.

It will be seen that I have invented an expansible trailer having a low floor level and consequent stability without sacrificing space required for furniture. The entire floor space of the movable section 40, with the exception of the movable floor portion 60 is available for fixed furniture, indicated in Fig. 5 by 100, and even the space above the floor portion 60 may be used by elevating the fixtures to the height necessary to permit the floor portion to be moved and the wheel housing 39 to traverse the path so provided. Thus the movable section 40 may be divided by fixtures as by a partition. In addition to having comfort and convenience both on the road and in camp, the trailer is sturdily constructed, well-supported, and has few parts subject to damage either by use on the highways or during the expanding and compacting operations at a camp.

Numerous modifications of arrangement and construction of parts of my expansible trailer will occur to those skilled in the art, without departure from the spirit and scope of my invention, which is to be understood as being set forth in the appended claims, for which the above description and the illustrations serve as an example.

I claim:

1. In a vehicle of the character described: a chassis having wheels; a stationary house section mounted on said chassis; a house section movable laterally with respect to said stationary section to an expanded position and to a compacted position; each of said sections having one side wall and a floor; rectangular wheel housings adjacent the lateral margins of the floor of said stationary section, extending upwardly therefrom; the floor of said movable section being disposed above the floor of said stationary section and having lateral recesses adapted to fit around said wheel housings, and having a movable portion aligned between said recesses; and rectangular cover structures for said recesses extending upwardly of said wheel housings and having movable wall means in alignment with said movable floor portion; said movable wall means and said movable floor portion being arranged to permit relative lateral movement of said house sections when in one position, and to form a closed floor in another position.

2. In a vehicle of the character described: a chassis having wheels; a stationary house section mounted on said chassis; a house section movable telescopically with respect to and within said stationary section to a laterally expanded position; each of said sections having one side wall and having a floor disposed below the upper range of movement of said wheels; wheel housings adjacent the lateral margins of the floor of said stationary section, extending upwardly therefrom; the floor of said movable section having a portion aligned with said wheel housings adapted to be raised to permit lateral movement of said floor with respect to said wheel housings, and having recesses at the lateral ends of said portion adapted to fit around said wheel housings; and fixtures surmounting said recesses and adapted to serve as covers for said wheel housings and having movable wall portions at the level of said wheel housings to permit movement of said fixtures in and out of covering positions.

3. In a vehicle of the character described: a chassis having wheels; a stationary house section mounted on said chassis; a house section fitting telescopically within said stationary section and movable laterally with respect thereto; both of said sections having floors disposed below the upper range of movement of said wheels; wheel housings adjacent the lateral margins of the floor of said stationary section, extending upwardly therefrom above the floor of said movable section; and hinged means, including a portion of the floor of said movable section, for forming a bottom closure for said movable section concealing said wheel housings when said sections are in compacted position and adapted for movement from the path of said wheel housings when said movable section is moved laterally.

4. In a vehicle of the character described: a chassis having wheels; a stationary house section mounted on said chassis; a house section fitting telescopically within said stationary section and movable laterally with respect thereto; both of said sections having floors disposed below the upper range of movement of said wheels; wheel housings adjacent the lateral margins of the floor of said stationary section, extending upwardly therefrom above the floor of said movable section; furniture fixtures disposed at the lateral margins of said movable section in alignment with said wheel housings; and hinged means, including a portion of the floor of said movable section, and the lower portions of said furniture fixtures, for forming a bottom closure for said movable section concealing said wheel housings when said sections are in compacted position and adapted for movement from the path of said wheel housings when said movable section is moved laterally.

5. In a vehicle of the character described: a chassis having wheels; a stationary house section mounted on said chassis; a house section movable telescopically within said stationary section to an extended position and to a compacted position, said wheels extending above the floors of both of said sections; means elevated above the floor of said movable section for excluding said wheels from the interior of said movable section when said movable section is in either of said positions; that portion of said floor of said movable section normally aligned between said wheels being adapted for movement to a position opening a path between said elevated means for relative movement of said wheels; and portions of said elevated means being movable to permit entry of said wheels to said path.

6. In a vehicle of the character described: a chassis having two transversely aligned wheels; a stationary house section mounted on said chassis; housings for each of said wheels extending above the floor of said stationary section; a house section slidable on the floor of said stationary section in lateral directions to extended and compacted positions; a fixture secured to said stationary section and surmounting one of said wheel housings; a second fixture secured to said movable section so as to surmount the other of said wheel housings when said movable section is in compacted position; a gate in the floor of said movable section openable to form a transversely extending path for said other wheel housing; and gate means secured to said movable section normally closed to conceal said wheel housings beneath said fixtures and openable to permit entry of said other wheel housing to said path.

7. In a vehicle of the character described: a wheeled chassis including side frame members and transverse floor joists supported by said frame members and arranged in spaced pairs defining channels between the joists of each pair; a stationary house section mounted on said chassis and having one open side and a floor supported by said joists; a house section movable telescopically within said stationary section and having a floor, and a side wall corresponding to the open side of said stationary section and extending downwardly outwardly of said floor joists and of said frame members and having openings aligned with the outer ends of said channels; anti-friction means on the lower surface of the floor of said movable section arranged to make contact with the floor of said stationary section in vertical relation to said channels; rails, each having one of its ends adapted to be inserted through said openings so as to be detachably held in said channels and to be supported by said frame members and to be held aligned with said channels by said side wall; track surfaces on said rails elevated above said one end of said rails so as to be positionable in horizontal alignment with the upper surface of the floor of said stationary section to receive and support said anti-friction means; and jack means for supporting the other ends of said rails.

JAMES VAN TASSEL.

REFERENCES CITED

The following references are of record in the file of this patent:

UNITED STATES PATENTS

| Number | Name | Date |
|---|---|---|
| 2,148,270 | Koets | Feb. 21, 1939 |
| 2,177,394 | Pierce | Oct. 24, 1939 |
| 2,225,319 | Rollo | Dec. 17, 1940 |

FOREIGN PATENTS

| Number | Country | Date |
|---|---|---|
| 493,964 | Great Britain | Oct. 18, 1938 |